United States Patent [19]

Engdahl et al.

[11] 4,280,051
[45] Jul. 21, 1981

[54] SCINTILLATION CRYSTAL MOUNTING APPARATUS

[75] Inventors: Lawrence W. Engdahl, Guilford; Allan J. Deans, Hamden, both of Conn.

[73] Assignee: Picker Corporation, Cleveland, Ohio

[21] Appl. No.: 948,341

[22] Filed: Oct. 4, 1978

[51] Int. Cl.³ ............................................. G01T 1/20
[52] U.S. Cl. ............................. 250/363 S; 250/366; 250/367
[58] Field of Search ................. 250/361 R, 367, 368, 250/521, 363 S, 366

[56] References Cited

U.S. PATENT DOCUMENTS

| | | | |
|---|---|---|---|
| 2,945,955 | 7/1960 | Mossop et al. | 250/361 R |
| 3,011,057 | 11/1961 | Anger | 250/363 S |
| 3,052,796 | 9/1962 | Platt | 250/361 R |
| 3,723,735 | 3/1973 | Spelha et al. | 250/368 |
| 3,784,819 | 1/1974 | Martone et al. | 250/363 S |
| 4,029,964 | 6/1977 | Ashe | 250/368 |
| 4,158,773 | 6/1979 | Novak | 250/361 R |

*Primary Examiner*—Alfred E. Smith
*Assistant Examiner*—Janice A. Howell
*Attorney, Agent, or Firm*—Watts, Hoffmann, Fisher & Heinke Co.

[57] ABSTRACT

An apparatus for mounting a scintillation crystal in a detector assembly of a gamma imaging device. The mounting apparatus effectively isolates forces applied by a spring biased array of phototubes from a frangible scintillation crystal. The crystal is separately biased to the light pipe using only the minimum force needed to insure good optical coupling.

14 Claims, 5 Drawing Figures

SCINTILLATION CRYSTAL MOUNTING APPARATUS

BACKGROUND OF THE INVENTION

This invention relates to gamma cameras and more particularly to a novel and improved detector head for a gamma camera.

In nuclear medicine diagnostic procedures, radioactive isotopes are administered to patients. These isotopes tend to concentrate in certain organs and tumors.

After the isotope has been administered an image of the spatial distribution of the isotope is developed to produce an aid to medical diagnosis. For example, if a patient has a brain tumor and radioactive technetium has been administered, the technetium will tend to concentrate in the tumor and an image of the technetium will show the location and size of the tumor.

The preferred imaging device for most diagnostic nuclear medical imaging is often referred to as an Anger-type camera. The first of these cameras is described in U.S. Pat. No. 3,011,057 issued Nov. 28, 1961, to Hal O. Anger and entitled "Radiation Imaging Device".

An Anger camera uses a disc-shaped, thallium activated sodium iodide crystal. When a gamma ray strikes the crystal, a light scintillation occurs. Since sodium iodide is hygroscopic it is encased in a hermetically sealed envelope. The envelope includes an output window of glass or other clear material to permit "viewing" of the scintillations.

The Anger patent shows an hexagonal array of seven phototubes which are optically coupled to the output window by a light pipe. The phototubes have flat input windows which are disposed in a common plane paralleling the crystal. The phototube windows are optically coupled to the light pipe to provide efficient transmission of light from the crystal through the window and the light pipe to the phototubes. The phototubes emit electrical signals each of which is proportional to the amount of incident light received from a scintillation by a phototube.

The camera of the Anger patent has circuitry which processes the outputs of the phototubes to produce X and Y co-ordinate signals and a Z signal which is the sum of the tube outputs for a given scintillation. The co-ordinate signals are supplied to deflector plates of an oscilloscope which is unblanked when the Z signal is of an appropriate value. These co-ordinate signals will produce a spot of light on an output phosphor of the oscilloscope at a location corresponding to the locus of the scintillation that produced the signals.

As larger scintillation crystals became available, Anger-type cameras were produced with larger hexagonal phototube arrays. Indeed, all commercial cameras have had more than seven tubes. For a number of years, commercial cameras were made with nineteen tubes. Now thirty-seven tube cameras have supplanted the nineteen-tube cameras as the most popular and sixty-one tube cameras are being produced.

The resolving capability of an Anger-type camera is at least in part a function of the spacing between the crystal and the plane of the phototube input windows. Martone et al U.S. Pat. No. 3,784,819 issued Jan. 8, 1974, entitled "Scintillation Camera with Light Diffusion System" discloses and claims a masking technique which has enjoyed great commercial success. An objective of the Martone patent disclosure is to permit phototubes to be moved closer to the crystal to improve resolution while at the same time providing a camera which has outstanding uniformity and linearity characteristics. Electronic techniques have also been developed for compensating for losses of uniformity and linearity that would otherwise occur if phototubes are positioned close to the crystal for high resolution. These techniques have permitted the use of thinner light pipes and output windows, which are in fact also light pipes. In fact, one manufacturer uses the output window of the crystal envelope as the total light pipe without an interposed member between the window and the phototubes.

Not only have light pipes become thinner as camera technology has progressed, but also the crystals themselves have become thinner. Thinner crystals have come into use due in large part to the development of lower energy isotopes a reasonable percentage of which will scintillate in, rather than penetrate through, a thin crystal.

As the crystals, light pipes and windows have become thinner and the numbers of tubes and the crystal diameters have increased, a problem has developed. The problem is maintaining the phototubes in the desired optically coupled relationship with the light pipe without excessive pressures biasing the tubes against the light pipe to maintain optical coupling. With the thin optical components and their large diameters, biasing of phototubes against the light pipe has resulted in excessive crystal cracking, especially during manufacturing operations.

Since a cracked crystal is useless, and a camera manufacturer's cost for a crystal assembly is of the order of $3,000, that there is a problem should be apparent. Further, crystal cracking often occurs at a relatively late stage in detector assembly, resulting in considerable lost assembly time and time to correct the problem.

SUMMARY OF THE INVENTION

The present invention provides a unique structure for maintaining the phototubes in the desired optical relationship with the light pipe while preventing the application of forces which will cause a crystal to crack.

In a preferred embodiment, the invention presents an improved detector head for a gamma imaging device. The detector head includes a housing and a detector assembly mounted within the housing. Components of the detector assembly include a crystal sub-assembly, a phototube array, and a light pipe between the phototube array and crystal sub-assembly.

The crystal sub-assembly includes a light transparent output window and a gamma radiation transmissive input window. The input window generally consists of a metal shell which shields the crystal from extraneous light and further serves to hermetically seal the crystal between it and the output window.

The phototube array includes a plurality of phototubes, the input faces of which, are parallel to the crystal surface. The phototubes generate electrical signals in response, and proportion, to light emitted by the crystal.

The light pipe is rigidly mounted within the detector head and transmits the light emitted by the crystal to the phototube array. To obtain good optical coupling between the detector components, biasing is utilized to insure complete contact between the array of phototubes and the light pipe, and the light pipe and the crystal assembly.

The present invention employs separate biasing for the phototube array and a crystal sub-assembly. The phototubes are individually spring biased into abutting engagement with an output surface of the light pipe. The crystal sub-assembly, is in turn biased separately into abutting engagement with an input surface of the light pipe.

To obtain good optical coupling between the surfaces, a layer of optical grease is placed between the phototubes and the light pipe, and between the output window of the crystal sub-assembly and the light pipe, in a known manner. The combination of the biasing and the optical grease provide the requisite optical coupling among the components.

The present invention provides a scintillation crystal mounting method superior to the prior art methods in that the coupling forces applied by the phototubes to the light pipe are substantially isolated from the crystal. Essentially, the light pipe is a fixed member within the detector assembly, to which the other detector components are biased into engagement. This construction, minimizes the risk of damage to the crystal. This mounting method allows larger diameter crystals to be used with a larger number of phototubes with minimum risks of crystal fracture.

In accordance with the broad aspects of this invention, it is an object to provide an improved detector assembly for a gamma imaging device.

It is another object of this invention to provide a novel scintillation crystal mounting apparatus.

It is a further object of this invention to provide a crystal mounting apparatus which insures optical coupling between the detector assembly components with minimum stress to the scintillation crystal.

Further objects and a fuller understanding of this invention will become obvious in reading the following description.

BRIEF DESCRIPTION OF THE DRAWINGS

In the drawings forming part of this application.

DESCRIPTION OF THE PREFERRED EMBODIMENT FOR A 61 TUBE CAMERA

Figure 1:
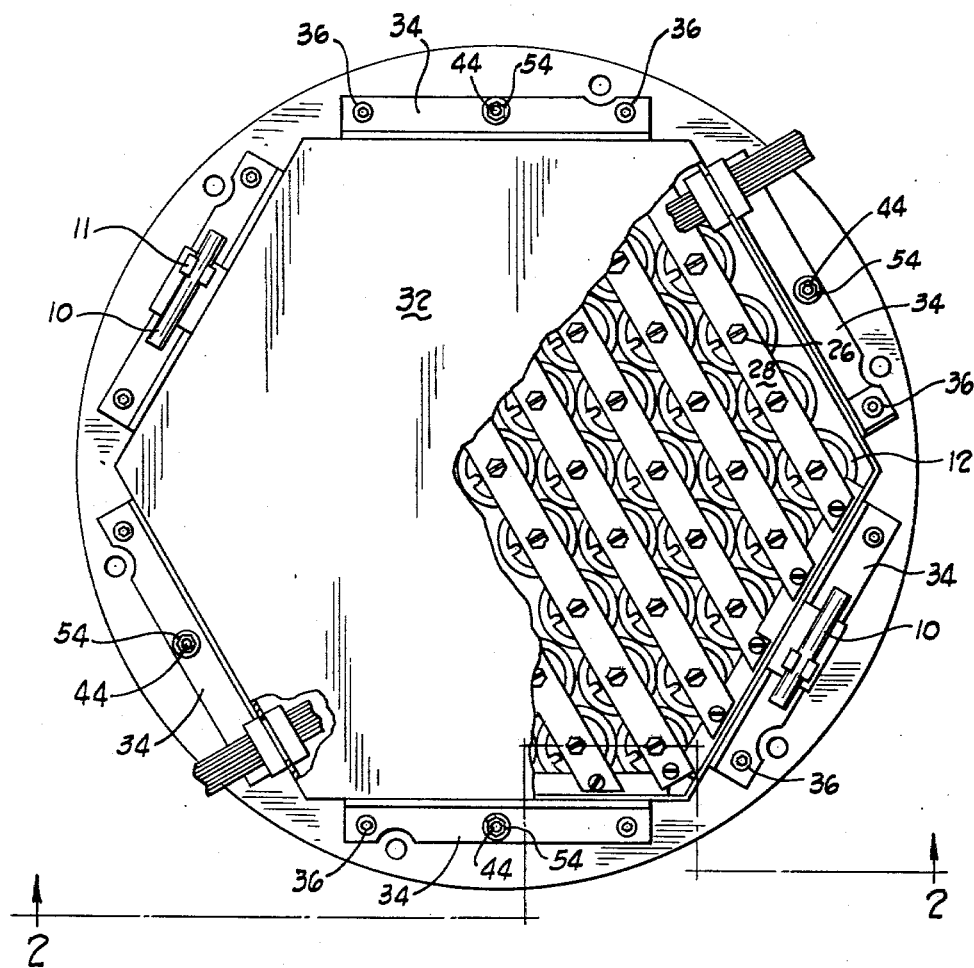
FIG. 1 is a top view of a detector assembly with a portion of it broken away to show the interior features.
Figure 2:
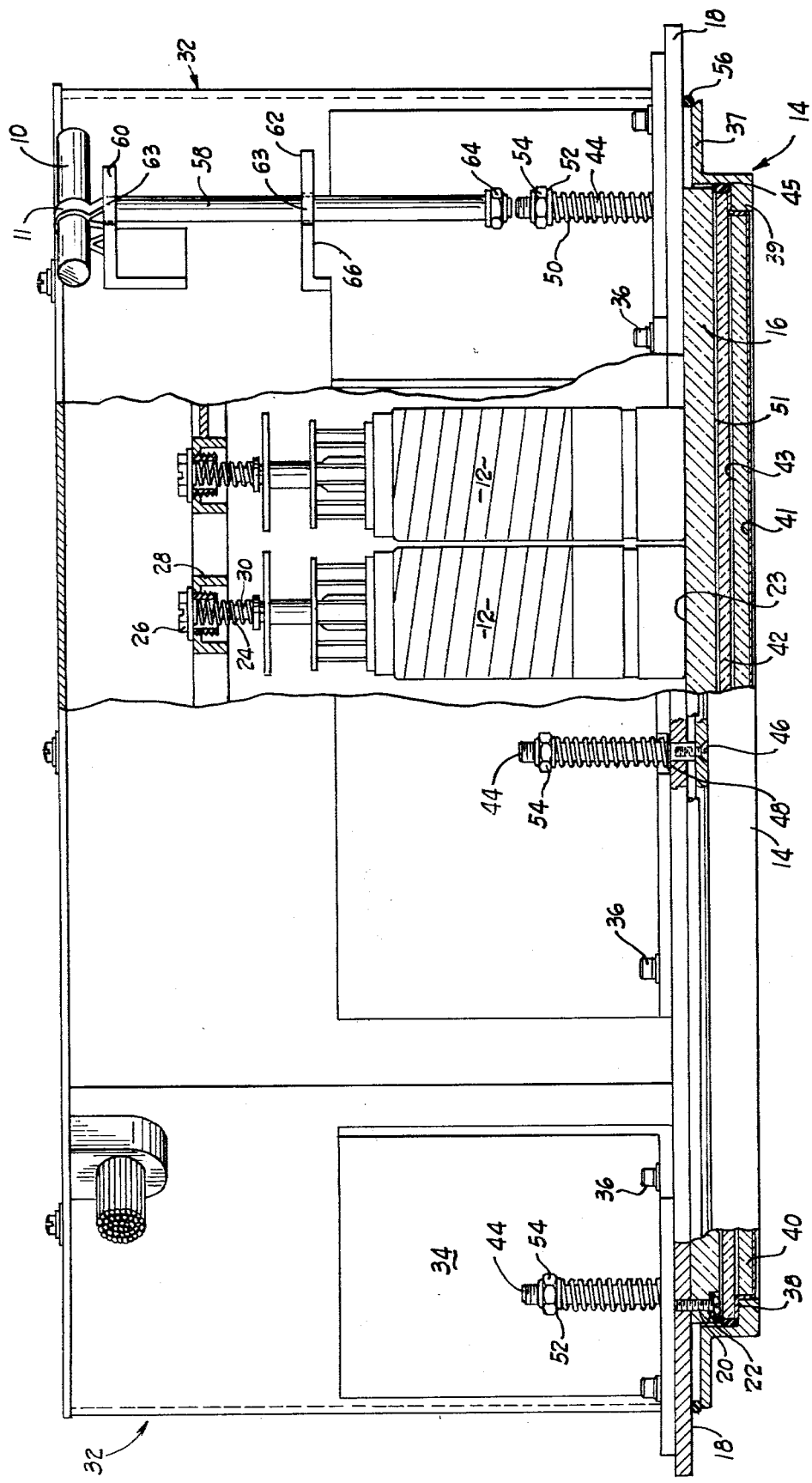
FIG. 2 is an elevational and cross-sectional view of the invention taken along the line 2—2.

Referring to FIGS. 1 and 2, a detector assembly of a gamma imaging device is shown. In use the detector assembly is mounted within a housing (not shown) and is provided with handles 10 to facilitate installation and removal.

Figure 3:
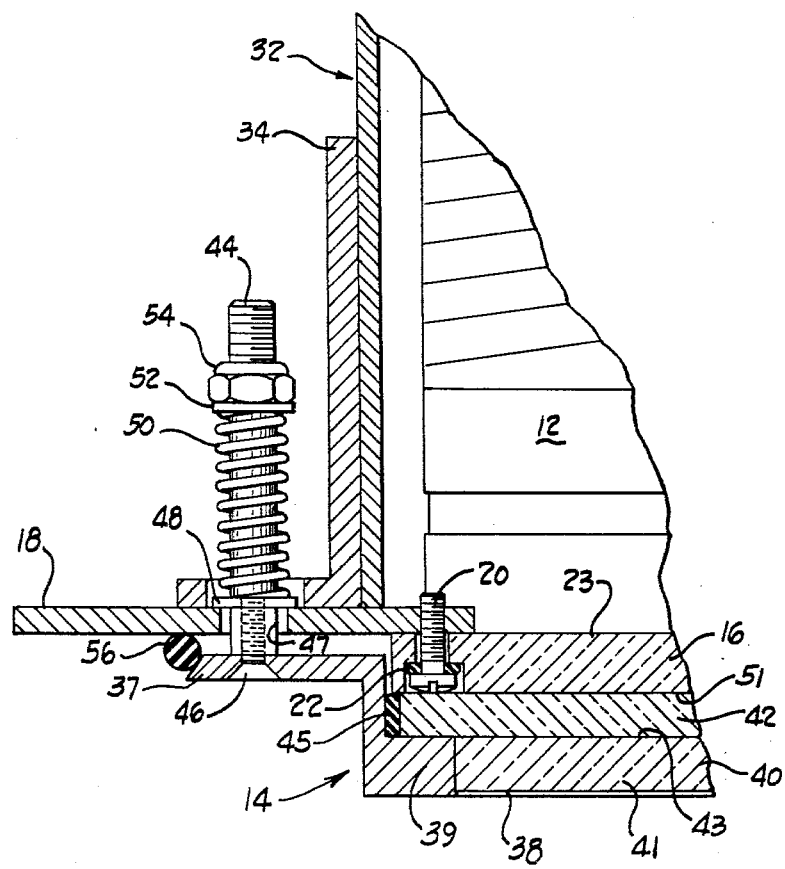
FIG. 3 is an enlarged fragmentary view of the detector assembly shown in FIGS. 1 and 2.

Referring also to FIG. 3 component parts of the detector assembly include an array of photomultiplier tubes 12, commonly referred to as phototubes, a crystal sub-assembly 14 and a light pipe 16.

The light pipe is mounted to an annular mounting ring 18 by threaded fasteners 20. Each fastener 20 is surrounded by an O-ring 22 which isolates the bottom surface of the fastener's associated screw head from the light pipe surface.

Included within the detector assembly is an array of 61 phototubes each individually biased into abutting engagement with the light pipe. The input faces of the phototubes 12 are parallel to and abut the top surface 23 of the light pipe. A layer of optical grease is placed between the abutting surfaces to insure good optical coupling. Each phototube is spring biased into engagement with the light pipe by an associated one of a plurality of springs 24 "Caplugs" 26 are threaded into an internal support bracket 28 and each secures and locates a different one of the springs 24 on one end. The other end of each spring surrounds an extended portion 30 of its associated phototube and is captured thereby. Each phototube 12 is then located and biased by the associated one of the springs 24.

A light shield shown generally as 32 covers and protects the phototube array. A plurality of mounting brackets 34 are attached to the exterior of the light shield and are secured to the mounting plate 18 by fasteners 36. This then forms a protective housing over the phototube array.

The crystal sub-assembly 14 includes an annular support ring 37 having a step portion 39, a metal shell 38 which is opaque to light but is gamma radiation transmissive, and a scintillation crystal 40 composed generally of thalium-activated sodium iodide. One surface of the scintillation crystal abuts the inner surface 41 of the metal shell. An optical window 42 abuts and is cemented to the output surface 43 of the crystal. The output window is also cemented and "potted" to the metal shell at 45, which serves to hermetically seal the crystal between the lower surface of the optical window and the inner surface of the metal shell. The crystal must be hermetically sealed due to its hydroscopic nature.

A plurality of threaded studs 44 are secured to the support ring 37 of the crystal sub-assembly at spaced locations each by one of a plurality of fasteners shown generally as 46. The studs each extend through one of apertures 47 (shown in FIG. 3) in the mounting plate 18. A washer 48, a resilient spring 50 and a washer 52 are placed on each stud 44 and are captured there by a nut 54. A peripheral O-ring 56 forms a light seal between the crystal sub-assembly and the lower surface of the mounting plate 18.

The force of the spring 50 exerted on the washer 52 will tend to urge the crystal sub-assembly 14 into abutting contact with the lower surface 51 of the light pipe 16. The engagement force between the crystal sub-assembly and the lower surface of the light pipe is determined by the distance each nut 54 is turned onto the threaded studs 44. Thus, it can be seen that the contact pressure of the crystal sub-assembly to the light pipe is adjustable and is generally selected to be the minimum force needed to obtain good optical contact between the abutting surfaces. A layer of optical grease is placed between the abutting surfaces to insure optical coupling.

The optical window 42, although a part of the crystal sub-assembly, is actually an extension of the light pipe 16. In fact, the light pipe 16, the optical window 42, and the optical grease in the surface interface can be replaced by a unitary member if a suitable seal is provided for the scintillation crystal to prevent moisture absorption. In this type of configuration, the crystal would be biased into abutting engagement with the lower surface of the single component or unitary light pipe and the phototubes would be individually biased into abutting engagement with the top surface of the light pipe. This construction would effectively isolate the phototube biasing forces from the crystal.

Each lift-out handle 10, is attached to an elongate member 58 which is located by a support bracket 60 and a support portion 62 formed as part of one of the mounting brackets 34. Bearings 63, mounted to the support bracket 60 and the support portion 62, each allow an associated elongate member 58 to slide upward until a nut 64 secured to it contacts lower surface 66 of the support portion 62. Further raising of the handles effects removal of the detector assembly from within a detector head (not shown). Normally, the handles are held in retracted positions by plastic clips 11.

DESCRIPTION OF PREFERRED EMBODIMENT FOR 37 TUBE CAMERAS

Figure 4:
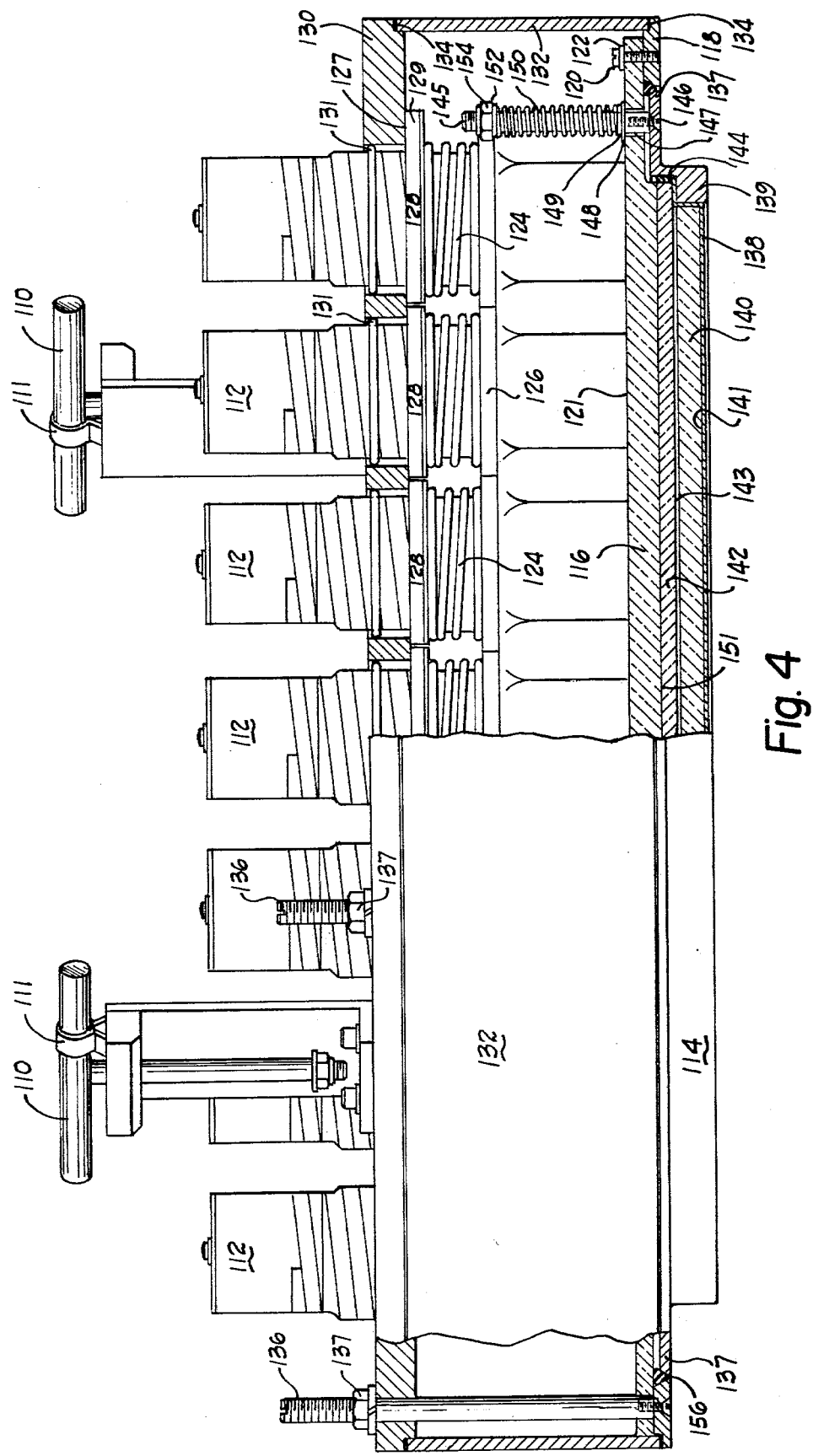
FIG. 4 is a view of an alternate detector assembly with a portion of it broken away to display the interior features.
Figure 5:
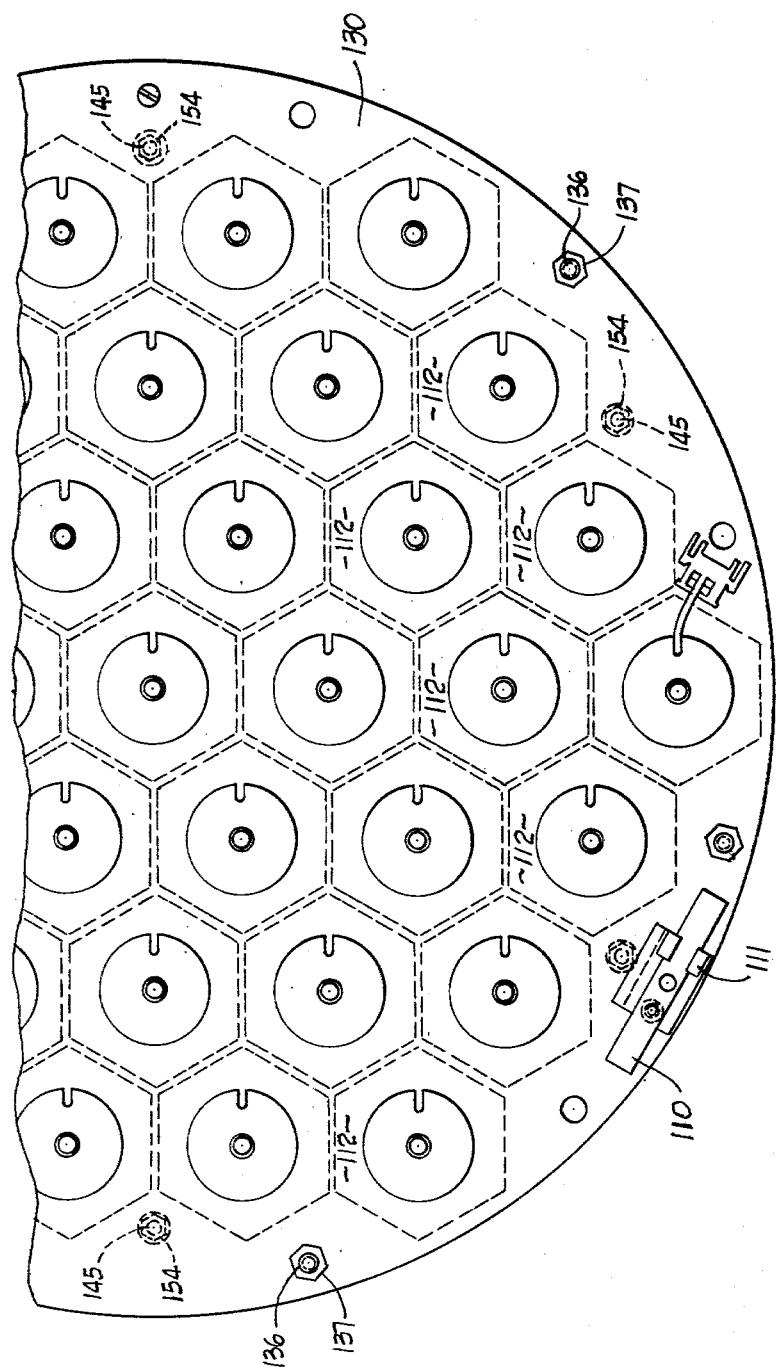
FIG. 5 is a fragmentary top view of the detector assembly shown in FIG. 4.

A 37 tube camera embodiment of the present invention is shown in FIGS. 4 and 5. A pair of handles 110, are provided to facilitate installation and removal. The detector assembly includes an array of 37 phototubes, each designated as 112, a crystal sub-assembly 114, and a light pipe 116.

The light pipe is rigidly mounted to an annular mounting plate 118 by a series of threaded fasteners 120, the head of each fastener being isolated from the light pipe by a nylon washer 122. The hexagonally shaped input faces of the phototubes are parallel to and abut the top surface 121 of the light pipe 116. Each phototube is individually biased into engagement with the light pipe by an associated one of a set of springs 124. Each spring 124 surrounds the neck of its associated tube. One end of the spring 124 seats against a phototube flange 126. Individual pressure plates 128 apply pressure to the other ends of each biasing spring 124 when an apertured housing cover 130 is clamped in place. Each pressure plate 128 includes an elastomeric portion 129 which forms a sealing interface at 127 between each pressure plate and the housing cover 130. Each phototube is further provided with an O-ring 131 which provides a seal between the phototube and the housing cover 130.

A cylindrically shaped tube spacer 132 is disposed between the mounting plate 118 and the housing cover 130. Gaskets 134 are disposed between the cover 130 and the spacer 132 and between the mounting plate 118 and the spacer. The mounting plate 118 and the cover 130 are clamped to the spacer 132 by a plurality of studs 136. Each stud 136 extends through the mounting plate 118, the light pipe 116 and the cover 130 and receives a washer and nut 137 to secure the assembly. The components 130, 132 and 118 then form a sealed protective housing in which the heads of the phototube array are located.

The crystal sub-assembly 114 is virtually identical to the crystal sub-assembly 14 of the 61 tube embodiment. It includes an annular support ring 137 having a step 139, a metal shell 138 which is opaque to light but is gamma radiation transmissive, and a scintillation crystal 140 composed generally of thalium-activated sodium iodide which is located in the lower portion of the shell. One surface of the scintillation crystal abuts the inner surface 141 of the metal shell. An optical window 142 abuts and is cemented to the output surface 143 of the crystal. The optical window is also cemented and "potted" to the metal shell at 144 and serves to hermetically seal the crystal between the window and the metal shell.

A plurality of threaded studs 145 are secured to the crystal sub-assembly at spaced locations by fasteners shown generally as 146. Each stud 145 extends through an associated one of a set of apertures 147 in the light pipe 116. Each stud 145 is surrounded by an associated nylon washer 148, a felt washer 149, a spring 150 and a washer 152 which are captured there by a nut 154. The force of the spring 150 exerted on the washer 152 will tend to urge the crystal sub-assembly 114 into abutting contact with the lower surface 151 of the light pipe 116. The abutment force between the crystal sub-assembly and the lower surface of the light pipe is determined by the distance each nut 154 is turned onto its threaded stud 145. Thus, it can be seen that the contact pressure of the crystal sub-assembly to the light pipe is adjustable and is generally selected to be the minimum force needed to obtain good optical contact between the abutting surfaces. A peripheral O-ring 156 forms a light seal between the crystal sub-assembly and the mounting plate 118.

Although the features of this invention have been described with a certain degree of particularity, various changes and modifications can be made to it by those skilled in the art without departing from the spirit and scope of the invention as described and hereinafter claimed.

1. In a gamma imaging device, an improved detector head comprising:
 (a) a housing
 (b) a detector assembly removably mounted within said housing, said assembly comprising:
  (i) a crystal sub-assembly including an output window, generally light transparent, and an input window, generally opaque to light but transparent to gamma radiation;
  (ii) a plurality of spaced phototubes for receiving light energy emitted from said crystal sub-assembly;
  (iii) an optical member for transmitting light energy from said crystal sub-assembly to said phototubes, said member having an input and an output surface;
  (iv) optical member mounting means for rigidly mounting said optical member to said detector assembly, said mounting means preventing relative movement between said optical member and said detector assembly;
  (v) a first biasing means urging said phototubes into abutting engagement with the output surface of said rigidly mounted optical member;
  (vi) a resilient second biasing means urging said crystal sub-assembly into abutting engagement with the input surface of said optical member;
  (vii) optical coupling means in the interface between the phototubes and the output surface of the optical member and between the output window of the crystal sub-assembly and the input surface of the optical member.

2. In a gamma imaging device, an improved detector head comprising:
 (a) a housing;
 (b) a detector assembly removably mounted within said housing, said assembly comprising:
  (i) an optical member having an input surface and an output surface
  (ii) optical member mounting means attached to said optical member for rigidly mounting said optical member to said detector assembly, said mounting means preventing relative movement between said optical member and said detector assembly;

(iii) a crystal sub-assembly including a generally light transparent output window, an input window generally opaque to light but transparent to gamma radiation, and a crystal support means for mounting said crystal sub-assembly to said detector assembly, said crystal support means being spaced from said optical member mounting means when said crystal sub-assembly is in an operative position with respect to said optical member;

(iv) a plurality of spaced phototubes for receiving light energy emitted from said crystal sub-assembly, said phototubes biased into abutting engagement with the output surface of said optical member, said phototube biasing forces being substantially isolated from said crystal sub-assembly by said rigid optical member mounting;

(v) spring biasing means attaching said crystal sub-assembly to said detector assembly said spring biasing means urging said crystal support means towards said optical member mounting means thereby causing abutting engagement between said crystal output window and said input surface of said optical member.

3. The apparatus of claim 2 further including light sealing means between said optical member mounting means and crystal sub-assembly support means.

4. The apparatus of claim 2 wherein said optical member mounting means and crystal sub-assembly support means are annular metal rings.

5. The apparatus of claims 1 or 2 wherein said optical member is a light pipe.

6. The apparatus of claim 2 wherein said phototubes are spring biased.

7. The apparatus of claim 2 wherein said crystal sub-assembly is biased by an adjustable spring means.

8. The apparatus of claim 2 further including an optical coupling means in the interface between the phototubes and the output surface of said optical member and between the output window of said crystal sub-assembly and the input surface of the optical member.

9. The apparatus of claim 7 wherein said spring means comprises a plurality of springs symmetrically disposed about the perimeter of said crystal subassembly.

10. In a gamma imaging device, a detector head comprising:
(a) a housing;
(b) a detector assembly within said housing, said assembly comprising:
(i) a scintillation crystal;
(ii) a phototube array for receiving light energy emitted from said crystal;
(iii) an optical member, rigidly mounted within said detector assembly, for transmitting light energy from said crystal to said phototubes, said member having an input and an output surface;
(iv) a first biasing means urging said phototubes into abutting engagement with the output surface of said optical member;
(v) an adjustable spring biasing means urging said crystal into abutting engagement with the input surface of said optical member; and
(vi) optical coupling means in the interface between the phototubes and the output surface of the optical member and between the crystal of the input surface of the optical member.

11. The apparatus of claim 1 wherein said first biasing means and said second biasing means are independently adjustable.

12. In a gamma imaging device, a detector head comprising:
(a) a housing;
(b) a detector assembly within said housing, said assembly comprising:
(i) an optical member rigidly mounted within said detector assembly, said member having an input surface and an output surface;
(ii) a scintillation crystal biased into abutting engagement with the input surface of said optical member by an adjustable spring biasing means;
(iii) a phototube array for receiving light energy emitted from said crystal, said phototube array biased into abutting engagement with the output surface of said optical member.

13. A gamma camera detector comprising:
(a) a crystal assembly including a crystal and a housing around the crystal;
(b) the assembly including a window forming at least a portion of a light pipe;
(c) light pipe mounting means for fixing the light pipe within said detector;
(d) an array of light responsive elements abutting an output surface of the light pipe;
(e) element biasing means biasing the elements against the output surface of the light pipe; and,
(f) resilient crystal biasing means biasing at least some portions of the assembly to apply forces to the light pipe in opposition to the element biasing means forces.

14. The detector of claim 13 wherein the light pipe includes the window and an optically coupled element and wherein the opposed biasing forces are applied to the optically coupled element.

* * * * *